N. H. BEEBE, H. E. SMITH & G. W. DUVALL.
HURL CUTTER AND SEPARATOR.
APPLICATION FILED SEPT. 3, 1915.

1,247,491.

Patented Nov. 20, 1917.
4 SHEETS—SHEET 1.

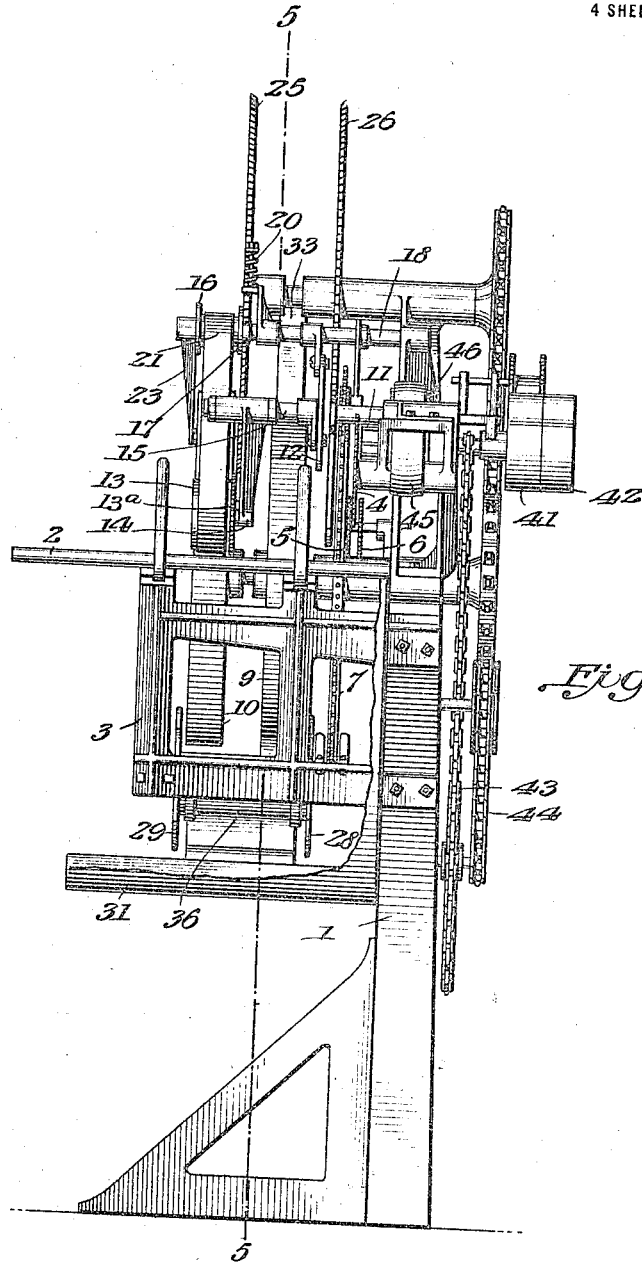

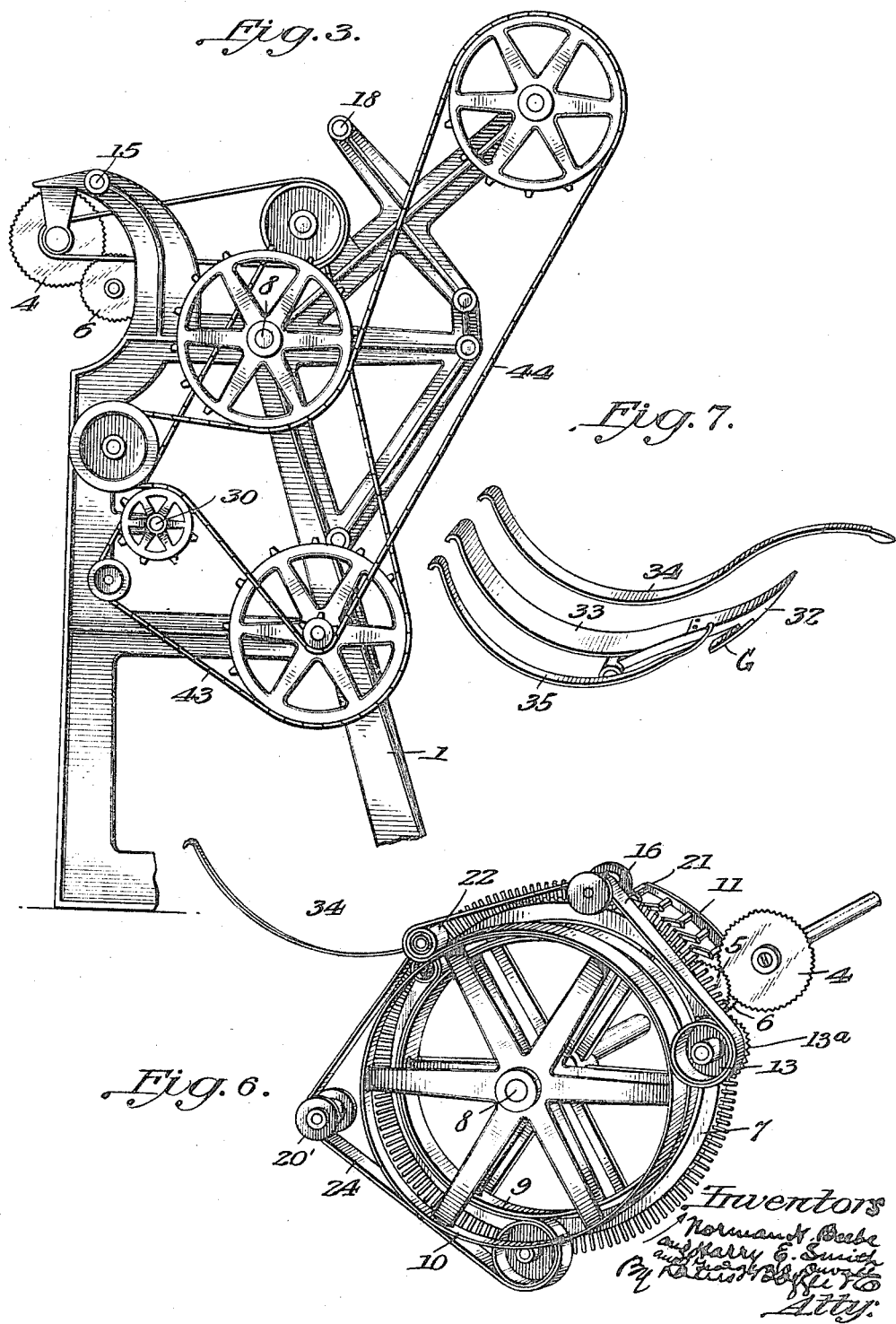

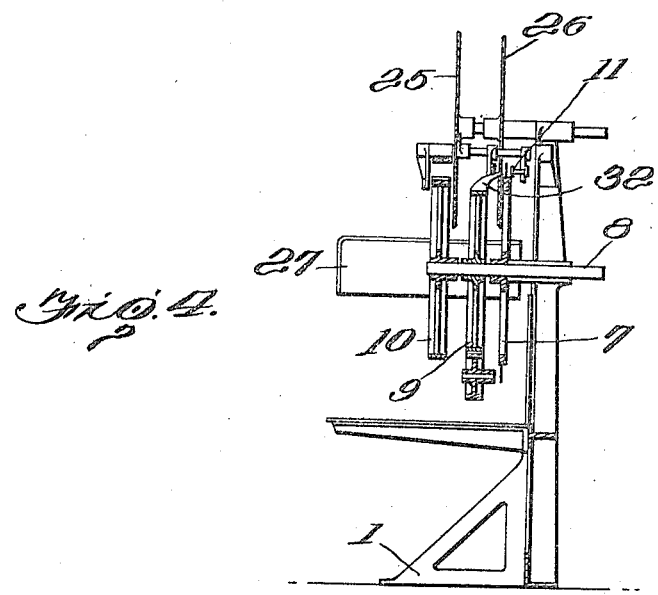
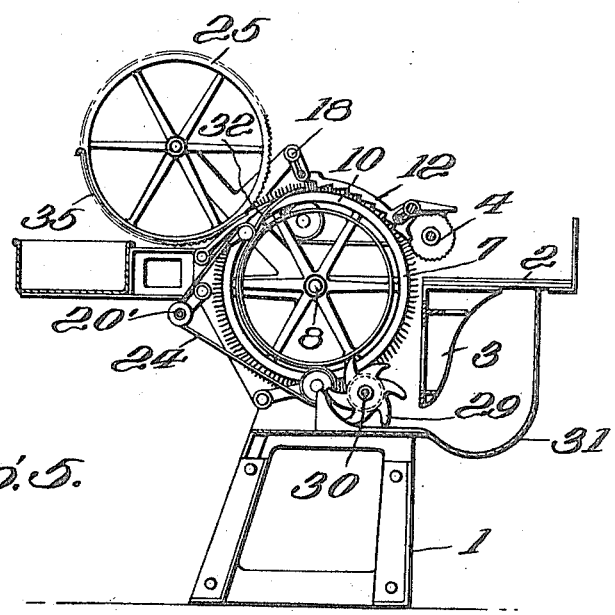

UNITED STATES PATENT OFFICE.

NORMAN H. BEEBE, OF ANTHONY, KANSAS, AND HARRY E. SMITH AND GEORGE W. DUVALL, OF DAVENPORT, IOWA, ASSIGNORS TO MODERN BROOM MACHINERY COMPANY, OF DAVENPORT, IOWA, A CORPORATION OF IOWA.

HURL CUTTER AND SEPARATOR.

1,247,491.     Specification of Letters Patent.    Patented Nov. 20, 1917.

Application filed September 3, 1915. Serial No. 48,916.

*To all whom it may concern:*

Be it known that we, NORMAN H. BEEBE, HARRY E. SMITH, and GEORGE W. DUVALL, citizens of the United States, the said NORMAN H. BEEBE residing at Anthony, county of Harper, State of Kansas, and the said HARRY E. SMITH and GEORGE W. DUVALL residing at Davenport, in county of Scott and State of Iowa, have invented certain new and useful Improvements in Hurl Cutters and Separators, of which the following is a specification.

Our invention relates to an improvement in hurl-cutter and separator.

The primary objects of this invention are to provide a machine which will cut broom corn stalks at a point called the joint and then separate the hurl corn from the coarse outside fibers known among broom makers as the pickings. The stalks of hurl are collected in a receptacle at the rear of the machine. The coarse fibers, or pickings are collected at the forward part of the machine under the feed table.

In the accompanying drawings:—

Fig. 2 is a front elevation of the same;

Fig. 3 is a side elevation showing main frame and method of applying power to the various moving parts;

Fig. 4, is a transverse vertical section on line 4—4 of Fig. 1;

Fig. 5 is a vertical section taken on line 5—5 of Fig. 2.

Fig. 6 is a detached view in perspective of some of the main operating parts; and Fig. 7 shows the press rails and needle.

Figure 1:
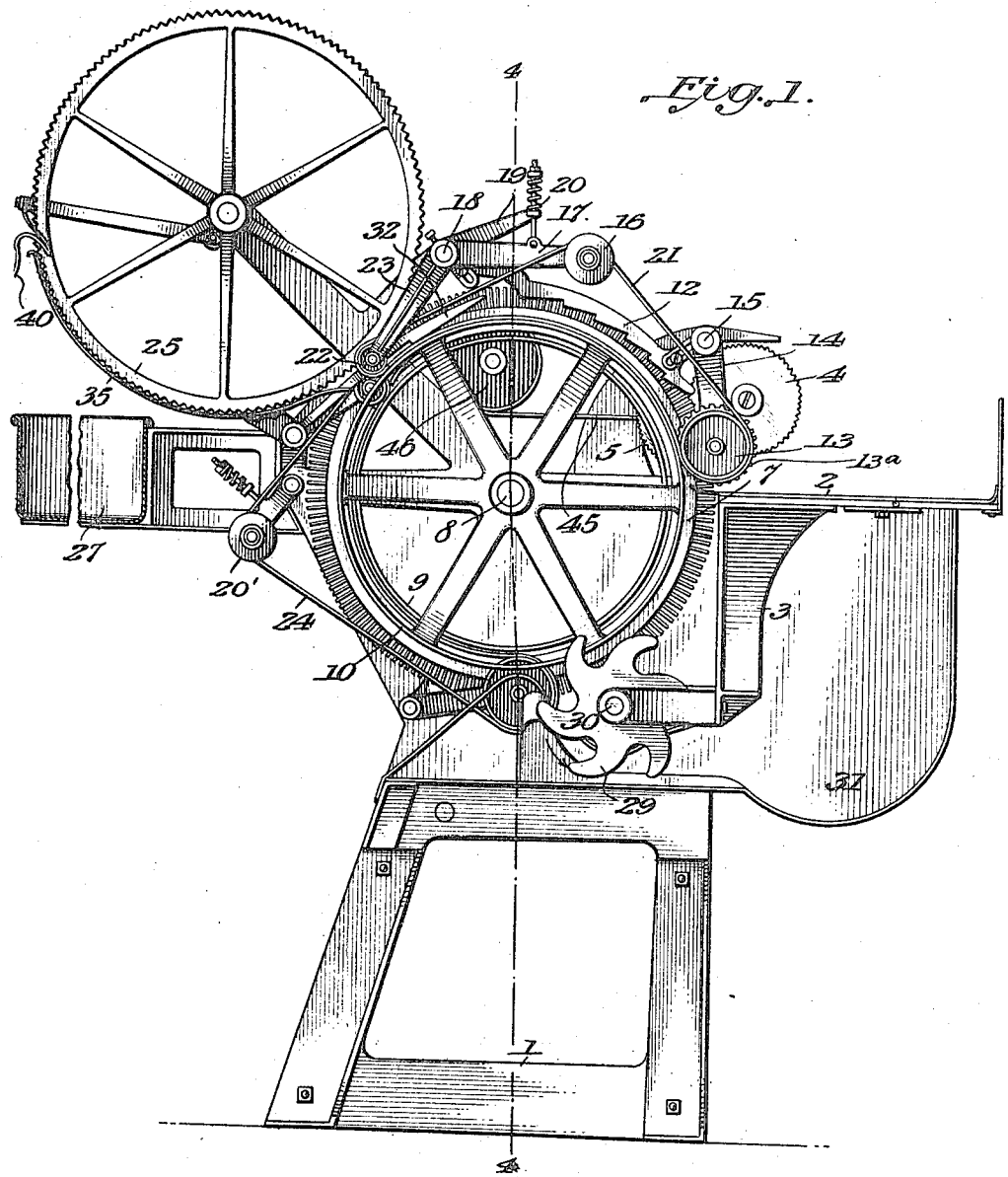
Figure 1 is a side elevation of the complete machine.

The numeral 1 indicates the main frame. This frame is preferably made in one piece. Numeral 2 is the feed table on which the broom corn is placed before being fed into the machine. This table is supported by the bracket 3, which bracket is bolted to the main frame 1.

Suspended above the table is the saw 4, which saw cuts the hurl. The feed-wheels 5 and 6 are adjustably held so that the saw revolves between them.

The numeral 7 indicates a wheel, the rim of which is filled with pins, as shown, and which is called the comb-wheel. The comb-wheel is mounted on the shaft 8, as are also the belt wheels 9 and 10.

The pickings guide 11 is located above and at one side of the comb-wheel. The forcer 12 is located above and on the opposite side of the comb-wheel.

The belt feed wheel 13 carrying the corn-feeding teeth 13ª revolves on a spindle held by the arm 14. The arm 14 is supported by the shaft 15. Shaft 15 is held by the main frame. Tightener-pulley 16 revolves on a spindle held by the arm 17. Arm 17 is free to rock on the shaft 18, which shaft is held by the main frame. The arm 19 is set-screwed at any desired position to shaft 18. By means of the coil-spring 20, the arm 17 is held up and the desired tension applied to the belt 21. The belt 21 passes around the rear pulley 22. This pulley revolves on a spindle held by the arm 23. The arm 23 is movably held by the shaft 18.

When the shaft 8 revolves, as indicated by the arrow, Fig. 5, the wheels 7, 9 and 10 revolve with it; thus the wheel 10 imparts motion to the belt 21.

The belt 24 operates in conjunction with the wheel 9 in the same manner as belt 21 operates with wheel 10. It will be noted wheel 9 is less in diameter than wheel 10.

A belt-tightener 20′ is likewise provided for the belt 24.

Mounted above and back of the apparatus just described are the notched conveyer wheels 25 and 26. Supported at the rear of the machine is the hurl-box 27.

Located beneath and forward of a vertical center are the packers 28 and 29. These packers are mounted on the shaft 30. The direction in which they rotate is indicated by the arrow, Fig. 1.

Numeral 31 represents the pickings receptacle. Numeral 32 is the needle to which the center press-rail 33 is attached. Numeral 34 is the press-rail on the main frame side of wheel 26 and is attached to pickings guide 11. Numeral 35 indicates the press-rail outside of wheel 25, having one of its ends bent around and entered in a hole in the needle. A circular housing 36 extends from packer 29 to packer 28, revolving with them.

The operation of the machine is as follows:

The operator moves a stalk of corn so that the brush end comes under the belt feed wheel 13. The stalk or joint end rests on the pins of the comb-wheel 7. The teeth of the feed-wheel 13 force the corn to move upward between the belt 21 and wheel 10. As the stalk moves upward, the saw 4 cuts it at the joint. The pickings or coarse fiber are attached to the outside of the stalk. The hurl straw grows attached to the stalk. After the cutting operation, the fine long straw is held together; thus, when cut, the stalk is released, but not the hurl, which still remains attached to the center or heart.

It will be noted that wheel 10 is less in diameter than comb-wheel; thus the stalk of corn is pressed firmly against the pins of the comb-wheel.

After passing the saw, the stalk passes under the forcer 12. This has the effect of crowding the stalk harder against the comb-wheel pins. By this action, the pickings are forced between the pins, but the hurl being large, remains on top of the pins. The ends of the pickings are caught by the inclines of the pickings guide and forced yet deeper between the pins. As the last incline on the pickings guide is prolonged to form the press-rail 34, it is impossible for the pickings to come out of the pins. As the machine continues to carry the straw onward, the pickings pass under the point of the needle 32, while the hurl passes over same. The projection G on needle 32 causes the pickings to pass between belt 24 and wheel 9. The hurl passes over the three press rails and is forced onward and deposited in the hurl-box 27 by the conveyer wheels 25 and 26.

The curved rods 40, one of which is placed at the side of each conveyer wheel, insure the discharge of the corn at the right point. The pickings are carried around and released just in front of packers 28 and 29. These revolving packers discharge the pickings into the receptacle 31.

The method of driving the various moving parts is shown in Figs. 2 and 3. Numeral 41 is the tight pulley, and numeral 42 is the loose pulley. The sprocket-chain 43 imparts motion to chain belt 44 by the means shown. Chain 44, as shown, imparts motion to all parts except the saw 4. The saw 4 is driven by the belt 45. This belt is driven by the pulley 46, which pulley is attached to the same shaft as 41.

We claim:

1. A hurl-cutter and separator comprising a rotary comb-wheel, a saw, feed-wheels between which the saw revolves, belt-wheels revolving with the comb-wheel, belts operating in conjunction with said belt-wheels, a belt feed-wheel, and a forcer beneath which the stalk passes and which crowds the stalk harder against the comb-wheel pins.

2. A hurl-cutter and separator comprising a rotary comb-wheel, a saw, feed-wheels between which the saw revolves, belt-wheels revolving with the comb-wheel, one of said belt-wheels of less diameter than the cone-wheel, whereby the stalk of corn is pressed firmly against the pins of the comb-wheel, belts operating in conjunction with said belt-wheels, a belt feed-wheel, and a forcer beneath which the stalk passes and which crowds the stalk harder against the comb-wheel pins.

3. A hurl-cutter and separator comprising a rotary comb-wheel, a saw, feed-wheels between which the saw revolves, belt-wheels revolving with the comb-wheel, said belt-wheels of different diameters, and both of which are of less diameter than the comb-wheel, whereby the stalk of corn is pressed firmly against the pins of the comb-wheel, belts operating in conjunction with said belt-wheels, a belt feed-wheel, and a forcer beneath which the stalk passes and which crowds the stalk harder against the comb-wheel pins.

4. A hurl-cutter and separator comprising a rotary comb-wheel, a saw, feed-wheels between which the saw revolves, belt-wheels revolving with the comb-wheel, belts operating in conjunction with said belt-wheels, a belt feed-wheel, a forcer beneath which the stalk passes and which crowds the stalk harder against the comb-wheel pins, notched conveyer-wheels mounted above and back of the comb-wheel, a hurl-box beneath said conveyer-wheels, packers located beneath and forward of the vertical center of the machine, and a pickings receptacle into which material is fed from the packers.

5. A hurl-cutter and separator comprising a rotary comb-wheel, a saw, feed-wheels between which the saw revolves, belt-wheels revolving with the comb-wheel, belts operating in conjunction with said belt-wheels, a belt feed-wheel, a forcer beneath which the stalk passes and which crowds the stalk harder against the comb-wheel pins, notched conveyer-wheels, a needle and press-rails, one of which is outside of one of the conveyer-wheels, and both of which press-rails are connected with the needle.

6. A hurl-cutter and separator comprising a rotary comb-wheel, a saw, feed-wheels between which the saw revolves, belt-wheels revolving with the comb-wheel, belts operating in conjunction with said belt-wheels, a belt feed-wheel, a forcer beneath which the stalk passes and which crowds the stalk harder against the comb-wheel pins, notched conveyer-wheels, a needle and three press-rails, two of which are connected with the needle, and one of the latter located outside of one of the conveyer-wheels.

7. A hurl-cutter and separator comprising a rotary comb-wheel, a saw, feed-wheels between which the saw revolves, belt-wheels revolving with the comb-wheel, belts operating in conjunction with said belt-wheels, a belt feed-wheel, a forcer beneath which the stalk passes and which crowds the stalk harder against the comb-wheel pins, notched conveyer-wheels, a needle and press-rails, one of which is outside of one of the conveyer-wheels, and both of which press-rails are connected with the needle, a projection on the needle which causes the pickings to pass between one of the belt-wheels and its belt, the press-rails so arranged that the hurl passes thereover, and a hurl-box which is adapted to receive the hurl when it has been deposited by the conveyer-wheels.

8. A hurl-cutter and separator comprising a comb-wheel, a pickings-guide, and a forcer located adjacent to the comb-wheel and on opposite sides thereof, a saw, belt-wheels, and belts operating in conjunction with said belt-wheels.

9. A hurl-cutter and separator comprising a comb-wheel, a pickings-guide, and a forcer located adjacent to the comb-wheel and on opposite sides thereof, a saw, belt-wheels, of different diameters and of less diameter than the comb-wheel, and belts operating in conjunction with said belt-wheels.

10. A hurl-cutter and separator comprising a comb-wheel, a pickings-guide, and a forcer located adjacent to the comb-wheel and on opposite sides thereof, a saw, belt-wheels, belts operating in conjunction with said belt-wheels, and means for applying the desired tension to said belts.

11. A hurl-cutter and separator comprising a frame, a comb-wheel, a saw, feed-wheels between which the saw rotates, belt-wheels, belts operating in conjunction with the peripheries of said belt-wheels, a pickings-guide, and a needle located at the junction between the two belts, the needle having a projection which causes the pickings to pass between one belt and its wheel.

12. A hurl-cutter and separator comprising a frame, a comb-wheel, a saw, feed-wheels between which the saw rotates, belt-wheels, belts operating in conjunction with the peripheries of said belt-wheels, a pickings-guide, a needle located at the junction between the two belts, the needle having a projection which causes the pickings to pass between one belt and its wheel, and press-rails, two of which are connected with the needle.

13. A hurl-cutter and separator comprising a frame, a comb-wheel, a saw, feed-wheels between which the saw rotates, belt-wheels, belts operating in conjunction with the peripheries of said belt-wheels, a pickings-guide, a needle located at the junction between the two belts, the needle having a projection which causes the pickings to pass between one belt and its wheel, conveyer-wheels, and press-rails, two of which are connected with the needle, and one of which latter is located outside of one of the conveyer-wheels.

14. A hurl-cutter and separator comprising a frame, a comb-wheel, a saw, feed-wheels between which the saw rotates, belt-wheels, belts operating in conjunction with the peripheries of said belt-wheels, a pickings-guide, a needle located at the junction between the two belts, the needle having a projection which causes the pickings to pass between one belt and its wheel, conveyer-wheels, press-rails, two of which are connected with the needle, and one of which latter is located outside of one of the conveyer-wheels, and curved rods, one of which is placed at the side of each conveyer-wheel to insure the discharge of the corn therefrom at the proper point.

15. A hurl-cutter and separator comprising a frame, a comb-wheel, a saw, feed-wheels between which the saw rotates, belt-wheels, belts operating in conjunction with the peripheries of said belt-wheels, a pickings-guide, a needle located at the junction between the two belts, the needle having a projection which causes the pickings to pass between one belt and its wheel, conveyer-wheels, press-rails, two of which are connected with the needle, and one of which latter is located outside of one of the conveyer-wheels, curved rods, one of which is placed at the side of each conveyer-wheel to insure the discharge of the corn therefrom at the proper point, packers in front of which the pickings are released by one of the belts, and a hurl-box and receptacle into which are conveyed the hurls from the conveyer-wheels and the pickings from the packers.

16. In a hurl-cutter and separator, the combination with a comb-wheel, of cutting means in proximity thereto, means for guiding and feeding stalks into said comb-wheel and said cutting means, means for crowding the severed stalks, means for guiding some of the stalks from the comb-wheel in advance of others, said means comprising a needle extending in the path of travel of said comb-wheel and arranged to separate the hurl from the pickings, a receptacle, and means arranged to guide the hurl thereto.

In testimony whereof we affix our signatures.

NORMAN H. BEEBE.
HARRY E. SMITH.
GEORGE W. DUVALL.